US009077426B2

(12) United States Patent
Ali et al.

(10) Patent No.: US 9,077,426 B2
(45) Date of Patent: Jul. 7, 2015

(54) ADAPTIVE ANTENNA MATCHING VIA A TRANSCEIVER-BASED PERTURBATION TECHNIQUE

(71) Applicant: BlackBerry Limited, Waterloo (CA)

(72) Inventors: Shirook M. Ali, Milton (CA); Amir Danak, Kitchener (CA); James P. Warden, Fort Worth, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 211 days.

(21) Appl. No.: 13/664,926

(22) Filed: Oct. 31, 2012

(65) Prior Publication Data

US 2014/0120850 A1 May 1, 2014

(51) Int. Cl.
*H04B 1/40* (2006.01)
*H04B 1/18* (2006.01)

(52) U.S. Cl.
CPC ........................................ *H04B 1/18* (2013.01)

(58) Field of Classification Search
CPC ............. H04B 1/38; H04B 1/40; H04B 1/406
USPC ............................... 455/77, 248.1, 115.1, 123
See application file for complete search history.

(56) References Cited

U.S. PATENT DOCUMENTS

| 3,366,883 | A | 1/1968 | Griffin et al. |
| 3,590,385 | A | 6/1971 | Sabo et al. |
| 4,165,493 | A | 8/1979 | Harrington |
| 4,739,329 | A | 4/1988 | Ward et al. |
| 5,564,086 | A | 10/1996 | Cygan et al. |
| 5,991,282 | A | 11/1999 | Langlet et al. |
| 6,262,684 | B1 | 7/2001 | Stewart et al. |
| 6,326,922 | B1 | 12/2001 | Hegendoerfer |
| 6,414,562 | B1 | 7/2002 | Bouisse et al. |
| 6,671,859 | B1 | 12/2003 | Naylor et al. |
| 6,757,423 | B1 | 6/2004 | Amini |
| 6,788,920 | B1 | 9/2004 | Zamat |
| 6,804,262 | B1 * | 10/2004 | Vogel et al. .................. 370/480 |
| 6,895,225 | B1 | 5/2005 | Talvitie et al. |
| 7,071,776 | B2 | 7/2006 | Forrester et al. |

(Continued)

FOREIGN PATENT DOCUMENTS

| EP | 2037576 A2 | 3/2009 |
| FR | 2573940 A1 | 5/1986 |
| WO | 2012067622 A1 | 5/2012 |

OTHER PUBLICATIONS

Bakr, Mohamed, H., et al.; "Dynamic Real-Time Calibration for Antenna Matching in the Transmitting and Receiving Modes"; International Journal of RF and Microwave Computer-Aided Engineering; vol. 22, No. 1; p. 59-67; Jan. 2012.

(Continued)

*Primary Examiner* — April G Gonzales
(74) *Attorney, Agent, or Firm* — Conley Rose, P.C.; J. Robert Brown, Jr.

(57) ABSTRACT

Embodiments are directed to a transceiver comprising a first section and a second section, and a controller configured to: receive an uplink reflected power measurement and a downlink power measurement at the same time, calculate an impedance associated with the first section based on the uplink power measurement and the downlink power measurement, and provide a tuning parameter to the second section to match an impedance of the second section with the impedance of the first section.

20 Claims, 11 Drawing Sheets

(56) References Cited

U.S. PATENT DOCUMENTS

| | | | |
|---|---|---|---|
| 7,512,384 B2 | 3/2009 | Toda et al. | |
| 7,528,674 B2 | 5/2009 | Kato et al. | |
| 7,586,384 B2 | 9/2009 | Ranta | |
| 7,711,337 B2 | 5/2010 | Mckinzie, III et al. | |
| 7,756,486 B1 | 7/2010 | Tan et al. | |
| 7,831,219 B2 | 11/2010 | Heuermann et al. | |
| 7,865,154 B2 | 1/2011 | Mendolia et al. | |
| 7,917,104 B2 | 3/2011 | Manssen et al. | |
| 7,925,220 B2 | 4/2011 | Baker | |
| 7,933,574 B2 | 4/2011 | Rofougaran et al. | |
| 8,098,210 B2 | 1/2012 | Massey et al. | |
| 8,190,109 B2 * | 5/2012 | Ali et al. | 455/123 |
| 8,213,886 B2 * | 7/2012 | Blin | 455/123 |
| 8,310,309 B2 | 11/2012 | Behera et al. | |
| 8,326,234 B2 | 12/2012 | Bakalski et al. | |
| 8,472,905 B2 | 6/2013 | Rofougaran | |
| 8,543,071 B2 | 9/2013 | El Kaamouchi et al. | |
| 2003/0048223 A1 | 3/2003 | Kezys | |
| 2003/0184319 A1 | 10/2003 | Nishimori et al. | |
| 2004/0009754 A1 | 1/2004 | Smith, Jr. | |
| 2005/0146387 A1 | 7/2005 | Toda et al. | |
| 2006/0025088 A1 | 2/2006 | Pietig et al. | |
| 2006/0160501 A1 | 7/2006 | Mendolia et al. | |
| 2007/0010217 A1 | 1/2007 | Takahashi et al. | |
| 2007/0035356 A1 | 2/2007 | Ranta | |
| 2007/0149146 A1 | 6/2007 | Hwang et al. | |
| 2007/0155347 A1 | 7/2007 | Heuermann et al. | |
| 2007/0197180 A1 * | 8/2007 | McKinzie et al. | 455/248.1 |
| 2008/0077361 A1 | 3/2008 | Boyd et al. | |
| 2008/0180345 A1 | 7/2008 | Larson et al. | |
| 2008/0180346 A1 | 7/2008 | Rofougaran | |
| 2008/0214125 A1 | 9/2008 | Haque et al. | |
| 2008/0261544 A1 | 10/2008 | Blin | |
| 2009/0011732 A1 | 1/2009 | Bayruns | |
| 2009/0066440 A1 | 3/2009 | Chan Wai Po et al. | |
| 2009/0121963 A1 | 5/2009 | Greene | |
| 2009/0157334 A1 | 6/2009 | Goodnow et al. | |
| 2009/0161586 A1 | 6/2009 | Kasai et al. | |
| 2009/0179807 A1 | 7/2009 | Peng | |
| 2009/0237170 A1 | 9/2009 | Van Zyl et al. | |
| 2009/0267746 A1 | 10/2009 | Muchkaev | |
| 2009/0289735 A1 | 11/2009 | Womac | |
| 2010/0069011 A1 | 3/2010 | Carrick et al. | |
| 2010/0073103 A1 * | 3/2010 | Spears et al. | 333/17.3 |
| 2010/0289711 A1 | 11/2010 | Boyle | |
| 2010/0317297 A1 | 12/2010 | Kratochwil et al. | |
| 2011/0075886 A1 | 3/2011 | Ashjaee et al. | |
| 2011/0086598 A1 * | 4/2011 | Ali et al. | 455/115.1 |
| 2011/0086600 A1 | 4/2011 | Muhammad | |
| 2011/0163935 A1 | 7/2011 | De Jongh et al. | |
| 2011/0254637 A1 * | 10/2011 | Manssen et al. | 333/2 |
| 2012/0051409 A1 * | 3/2012 | Brobston et al. | 375/222 |
| 2014/0210686 A1 | 7/2014 | Ali et al. | |

OTHER PUBLICATIONS de Mingo et al., "An RF Electronically Controlled Impedance Tuning Network Design and Its Application to an Antenna Input Impedance Automatic Matching System", IEEE Transactions on Microwave Theory and Techniques, vol. 52, No. 2, Feb. 2004, pp. 489-497.

Extended European Search Report for corresponding EP Application No. 13191162.0-1852, Feb. 11, 2014, pp. 1-8.

Ali, Shirook M., et al.; U.S. Appl. No. 14/357,404; Filed: May 9, 2014; Title: Perturbation-Based Dynamic Measurement of Antenna Impedance in Real-Time.

Ali, Shirook M., et al.; U.S. Appl. No. 12/579,38; Filed: Oct. 14, 2009; Title: Dynamic Real-Time Calibration for Antenna Matching in a Radio Frequency Receiver System.

Ali, Shirook M., et al.; U.S. Appl. No. 12/579,370; Filed: Oct. 14, 2009; Title: Dynamic Real-Time Calibration for Antenna Matching in a Radio Frequency Transmitter System.

Qiao, Dongjiang, et al.; "Antenna Impedance Mismatch Measurement and Correction for Adaptive CDMA Transceivers"; IEEE; 2005; 4 pages.

Parfitt, Andrew, et al.; "The Design of Active Receiving Antennas for Broadband Low-Noise Operation"; Proceedings of the XXVIIth URSI General Assembly in Maastricht; www.ursi.org/Proceedings/ ProcGA02/papers/ p1001.pdf; Aug. 2002; 4 pages.

Oh, Sung-Noon, et al.; "Automatic Antenna-Tuning Unit for Software-Defined and Cognitive Radio"; Wireless Communications and Mobile Computing; Wiley InterScience; 2007; 13 pages.

Ogawa, Koichi, et al.; "An Analysis of the Performance of a Handset Diversity Antenna Influence by Head, Hand, and Shoulder Effects at 900 MHz: Part I—Effective Gain Characteristics"; IEEE Transactions on Vehicular Technology; vol. 50; No. 3; May 2001; 15 pages.

Toftgard, Jorn, et al.; "Effects on Portable Antennas of the Presence of a Person"; IEEE Transactions on Antennas and Propagation; vol. 41; No. 6; Jun. 1993; 8 pages.

WiSPRY; "WiSpry Programmable RF Silicon Solutions"; http:// www.wispry.com/; Sep. 16, 2009; 1 page.

Paratek; "Adaptive RF: Iconic Phone's with No Compromises!"; http://www.paratek.com/; Sep. 16, 2009; 1 page.

Pozar, David M.; "Microwave Engineering"; Addison-Wesley Publishing Company; 1990; 12 pages.

Vian, James; "Double-Stub Impedance Matching Algorithm"; IEEE; 2007; 3 pages.

Press, William H., et al.; "Chapter 9: Root Finding and Nonlinear Sets of Equations"; Numerical Recipes in C: The Art of Scientific Computing; Second Edition; Cambridge University Press; Feb. 1993; 48 pages.

Oba, Hirokazu, et al.; "Adaptive Impedance Matching System Using FPGA Processor for Efficient Control Algorithm"; IEICE Transactions on Electronics; vol. E91.C; No. 8; Aug. 2008; 20 pages.

Chang, Kai, et al.; "Low-Cost Microwave/Millimeter-Wave Impedance Measuring Scheme Using a Three-Probe Microstrip Circuit"; IEEE Transactions on Microwave Theory and Techniques; Oct. 1990; 6 pages.

Office Action dated Dec. 15, 2011; U.S. Appl. No. 12/579,381, filed Oct. 14, 2009; 31 pages.

Final Office Action dated Mar. 30, 2012; U.S. Appl. No. 12/579,381, filed Oct. 14, 2009; 21 pages.

Advisory Action dated Jun. 8, 2012; U.S. Appl. No. 12/579,381, filed Oct. 14, 2009; 3 pages.

Office Action dated May 23, 2013; U.S. Appl. No. 12/579,381, filed Oct. 14, 2009; 16 pages.

Final Office Action dated Nov. 18, 2013; U.S. Appl. No. 12/579,381, filed Oct. 14, 2009; 18 pages.

Advisory Action dated Jan. 30, 2014; U.S. Appl. No. 12/579,381, filed Oct. 14, 2009; 3 pages.

Notice of Allowance dated Feb. 27, 2014; U.S. Appl. No. 12/579,381, filed Oct. 14, 2009; 12 pages.

Office Action dated Oct. 24, 2011; U.S. Appl. No. 12/579,370, filed Oct. 14, 2009; 15 pages.

Notice of Allowance dated Feb. 3, 2012; U.S. Appl. No. 12/579,370, filed Oct. 14, 2009; 16 pages.

PCT International Search Report; Application No. PCT/US2011/ 060540; Oct. 17, 2012; 7 pages.

PCT Written Opinion of the International Searching Authority; Application No. PCT/US2011/060540; Oct. 17, 2012; 8 pages.

PCT International Search Report; Application No. PCT/US2010/ 052648; Jan. 24, 2011; 6 pages.

PCT Written Opinion of the International Searching Authority; Application No. PCT/US2010/052648; Jan. 24, 2011; 9 pages.

PCT International Preliminary Report on Patentability; Application No. PCT/US2010/052648; Nov. 29, 2011; 7 pages.

European Examination Report; Application No. 10775964.9; Jul. 30, 2013; 8 pages.

PCT International Search Report; Application No. PCT/US2010/ 052651; Sep. 30, 2011; 4 pages.

PCT Written Opinion of the International Searching Authority; Application No. PCT/US2010/052651; Sep. 30, 2011; 6 pages \* cited by examiner

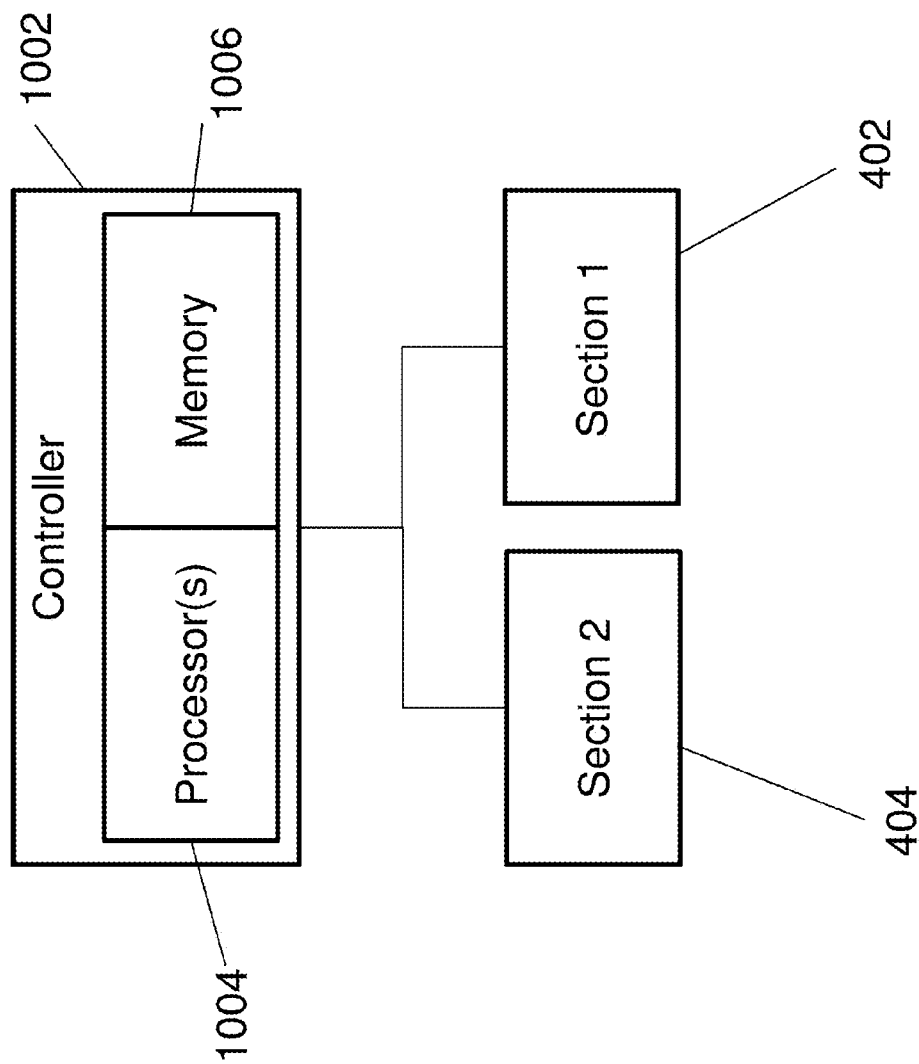

ADAPTIVE ANTENNA MATCHING VIA A TRANSCEIVER-BASED PERTURBATION TECHNIQUE

BACKGROUND

Advancements in adaptive antenna matching techniques have provided gains in terms of, e.g., total radiated power. Matching techniques may be used to compensate for a number of conditions, such as environmental effects, user effects, etc.

Current techniques are based on sensing reflected power on the antenna port. For example, in connection with a mobile device, a directional coupler may be used on a transmit or uplink side to drive a tunable matching circuit so as to minimize reflected power. These techniques: (1) are iterative, (2) lack knowledge of the direction the tunable circuit should be tuned toward during the first iteration, resulting in the use of trial-and-error to determine the appropriate direction, and (3) tune the circuit to cover a transmit or uplink band and assume that coverage is broad enough to support antenna matching in the receive or downlink band.

Current techniques provide for a computation of the input impedance of the antenna using a perturbation approach. A first technique is applied in connection with the uplink or transmitter. A second technique is applied in connection with the downlink or receiver. Three power measurements are needed for each of the first and second techniques to compute the antenna impedance value and then match the circuit to the computed value. A measurement period must be long enough to accommodate the time needed to obtain the measurements.

BRIEF DESCRIPTION OF THE DRAWINGS

The present disclosure may be understood, and its numerous objects, features and advantages obtained, when the following detailed description is considered in conjunction with the following drawings, in which:

FIG. 10 is an exemplary block diagram in accordance with one or more embodiments.

DETAILED DESCRIPTION

Figure 1:
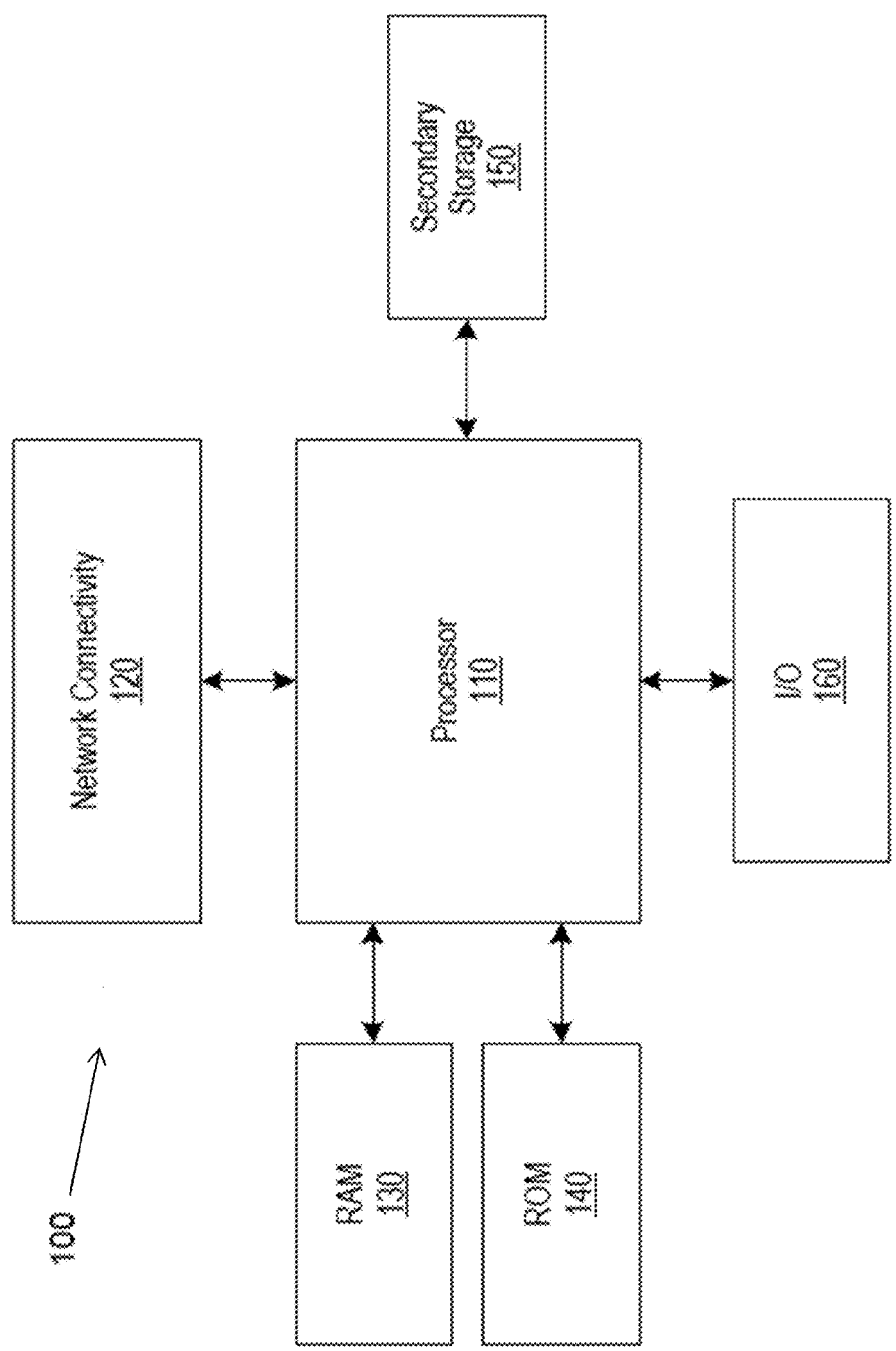
FIG. 1 depicts an exemplary system in which the present disclosure may be implemented.

The present disclosure is directed in general to communications systems and methods for operating the communications systems. In some embodiments, an impedance associated with an antenna may be computed. Radiation associated with the antenna may be controlled by adapting an impedance of a circuit based on the computation of the impedance associated with the antenna. In some embodiments, controlling the radiation associated with the antenna may include maximizing the radiation associated with the antenna for, e.g., one or more frequency points of operation. A matching technique, such as complex conjugate matching, may be used to maximize the radiation.

In some embodiments, one or more measurements from: (1) a transmitter or uplink, and/or (2) a receiver or downlink may be used to compute an impedance of a circuit or device, such as an antenna. In some embodiments, at least two of the measurements may be taken or obtained at the same time, e.g., during a time period in which the measurements substantially overlap with one another or during a common measurement period. The measurements may be taken in terms of one or more characteristics or parameters, such as power, energy, current, voltage, etc. Relative to prior solutions, embodiments of the disclosure may reduce a measurement period used to obtain the measurements in order to, e.g., compute the impedance.

In some embodiments, obtaining measurements on the uplink and the downlink, i.e., not on the same chain or link, would provide additional measurements for the same measurement period. The additional measurements may be used to improve or enhance accuracy. For example, the measurements may be combined (e.g., via filtering, averaging, etc.) to improve or enhance accuracy.

Aspects of the disclosure may be applied in connection with one or more technologies. For example, aspects of the disclosure may be applied in connection with environments where uplink and downlink transactions occur simultaneously (e.g., Long Term Evolution (LTE)).

An embodiment is directed to a device comprising: a transceiver comprising a first section and a second section, and a controller configured to: receive an uplink reflected power measurement and a downlink power measurement at the same time, calculate an impedance associated with the first section based on the uplink power measurement and the downlink power measurement, and provide a tuning parameter to the second section to match an impedance of the second section with the impedance of the first section.

An embodiment is directed to a device comprising: at least one processor, and memory having instructions stored thereon that, when executed by the at least one processor, cause the device to: receive an uplink reflected power measurement and a downlink power measurement associated with a transceiver at the same time, calculate an impedance associated with a first section of the transceiver based on the uplink power measurement and the downlink power measurement, and provide a tuning parameter to a second section of the transceiver to match an impedance of the second section with the impedance of the first section.

An embodiment is directed to a device comprising: at least one processor, and memory having instructions stored thereon that, when executed by the at least one processor, cause the device to: input initial values for one or more tunable elements, input a measured magnitude of a reflection coefficient in a transmit mode, input a power transmitted to a load in a receive mode, perturb the one or more tunable elements to obtain second values for the one or more tunable elements, input a second power transmitted to the load in the receive mode, and compute a reflection coefficient for an antenna based on the initial values for the one or more tunable elements, the measured magnitude of the reflection coefficient, the power transmitted to the load in the receive mode, the second values for the one or more tunable elements, and the second power transmitted to the load in the receive mode.

An embodiment is directed to a method comprising: receiving, by a computing device, an uplink reflected power measurement and a downlink power measurement at the same time, calculating, by the computing device, an impedance associated with a first section of a transceiver based on the uplink power measurement and the downlink power measurement, and providing, by the computing device, a tuning parameter to a second section of the transceiver to match an impedance of the second section with the impedance of the first section.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable instruction sequence, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers (HLR), visited location registers (VLR), Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or alternatively, to devices that have similar capabilities that are not generally transportable, such as desktop computers, set-top boxes, or sensors. A network node, as used herein, generally includes all nodes with the exception of client nodes, server nodes and access nodes. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc.) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. The actual dimensions of the cell may depend on the radio frequency of operation, the radio propagation conditions and the density of communications traffic. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter.

Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices (including radio, optical or infra-red signals), radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives, solid state drives, or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, track pads, voice recognizers, card readers, paper tape readers, printers, video monitors, or other well-known input/output devices.

Figure 2:
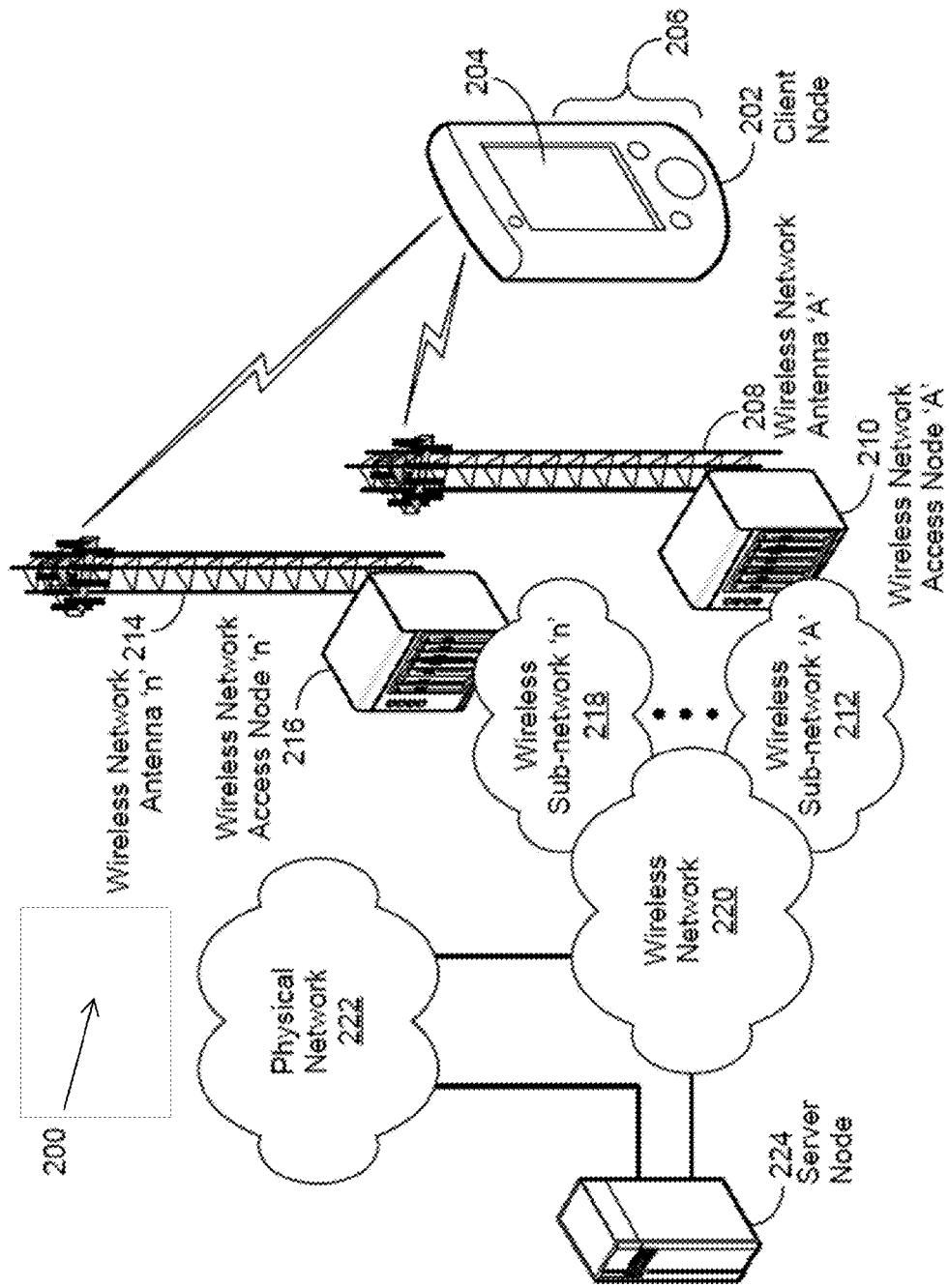
FIG. 2 shows a wireless-enabled communications environment including an embodiment of a client node.

FIG. 2 shows a wireless-enabled communications environment including an embodiment of a client node as implemented in an embodiment of the disclosure. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, DVORAK, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be moved to different positions, e.g., inwardly depressed, to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a core network 222, e.g., a global computer network such as the Internet. Via the wireless network 220 and the core network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless sub-network 212. Skilled practitioners of the art will recognize that many such embodiments are possible and the foregoing is not intended to limit the spirit, scope, or intention of the disclosure.

Figure 3:
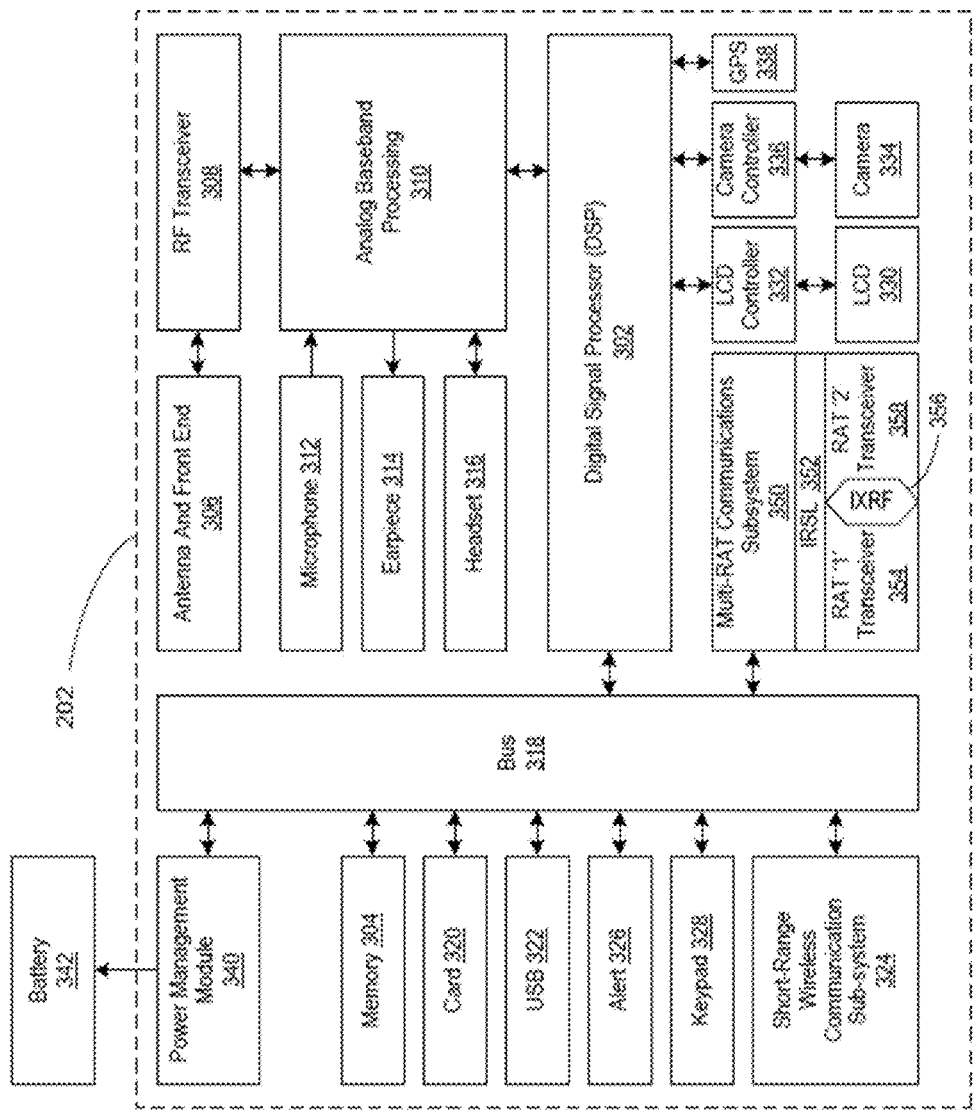
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the disclosure. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface ("Bus") 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 306 may include multiple antennas to support beam forming and/or multiple input multiple output (MEMO) operations. As is known to those skilled in the art, MEMO operations may provide spatial diversity, which can be used to overcome difficult channel conditions or to increase channel throughput. Likewise, the antenna and front-end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

Note that in this diagram the radio access technology (RAT) RAT1 and RAT2 transceivers 354, 358, the IXRF 356, the IRSL 352 and Multi-RAT subsystem 350 are operably coupled to the RF transceiver 308 and analog baseband processing unit 310 and then also coupled to the antenna and front end 306 via the RF transceiver 308. As there may be multiple RAT transceivers, there will typically be multiple antennas or front ends 306 or RF transceivers 308, one for each RAT or band of operation.

The analog baseband processing unit 310 may provide various analog processing of inputs and outputs for the RF transceivers 308 and the speech interfaces (312, 314, 316). For example, the analog baseband processing unit 310 receives inputs from the microphone 312 and the headset 316 and provides outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes. The short-range wireless communication Sub-system 324 may also include suitable RF Transceiver, Antenna and Front End subsystems.

The input/output interface ("Bus") 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface ("Bus") 318 to provide one mechanism for the user to make selections, enter information, and otherwise provide input to the client node 202. The keyboard 328 may be a full or reduced alphanumeric keyboard such as QWERTY, DVORAK, AZERTY and sequential types, or a traditional numeric keypad with alphabet letters associated with a telephone keypad. The input keys may likewise include a trackwheel, track pad, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to make digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. The GPS sensor 338 may be coupled to an antenna and front end (not shown) suitable for its band of operation. Various other peripherals may also be included to provide additional functions, such as radio and television reception.

In various embodiments, the client node (e.g., 202) comprises a first Radio Access Technology (RAT) transceiver 354 and a second RAT transceiver 358. As shown in FIG. 3, and described in greater detail herein, the RAT transceivers '1' 354 and '2' 358 are in turn coupled to a multi-RAT communications subsystem 350 by an Inter-RAT Supervisory Layer Module 352. In turn, the multi-RAT communications subsystem 350 is operably coupled to the Bus 318. Optionally, the respective radio protocol layers of the first Radio Access Technology (RAT) transceiver 354 and the second RAT transceiver 358 are operably coupled to one another through an Inter-RAT eXchange Function (IRXF) Module 356.

In various embodiments, the network node (e.g. 224) acting as a server comprises a first communication link corresponding to data to/from the first RAT and a second communication link corresponding to data to/from the second RAT.

Figure 4A:
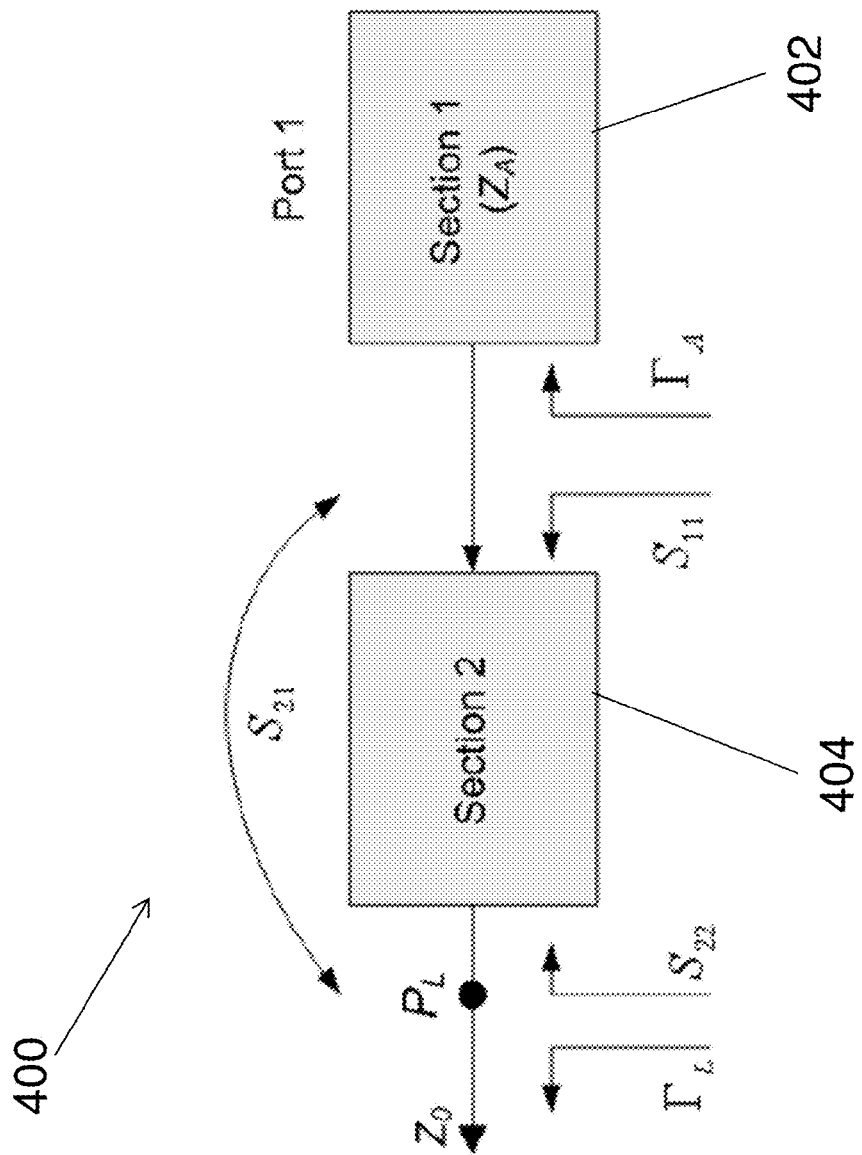
FIG. 4A is an exemplary block diagram in accordance with one or more embodiments.
Figure 4B:
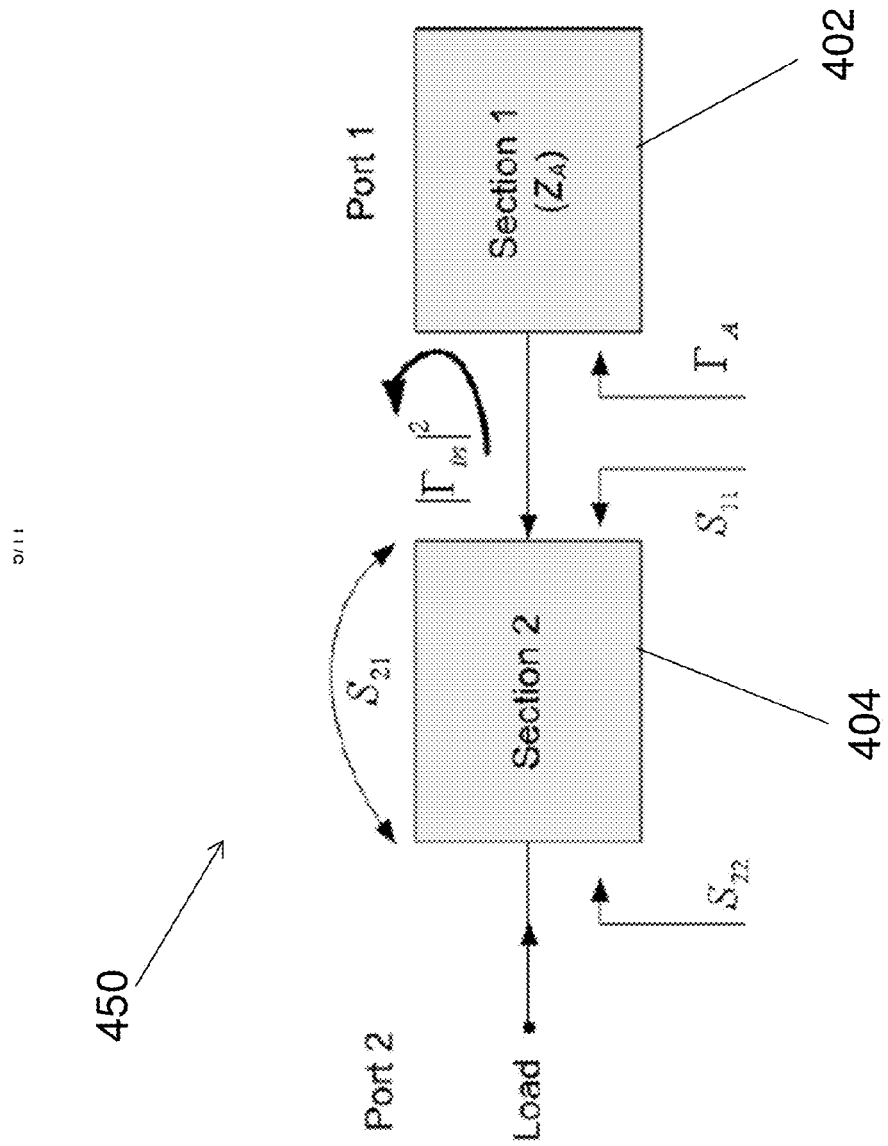
FIG. 4B is an exemplary block diagram in accordance with one or more embodiments.

Turning now to FIGS. 4A and 4B, exemplary block diagrams 400 and 450 in accordance with one or more embodiments are shown. In some embodiments, the block diagrams 400 and 450 may be associated with a transceiver (e.g., transceiver 308 of FIG. 3) and/or an antenna (e.g., antenna and front end 306 of FIG. 3). More generally, the block diagrams 400 and 450 may correspond to embodiments that are associated with one or more of the components or devices of FIGS. 1-3.

In some embodiments, the block diagram 400 may be indicative of communications in a downlink or receive direction with respect to a system or infrastructure, such as a mobile communication system. One or more signals received at a first section (Section 1) 402 may be conveyed to a second section (Section 2) 404. In conveying a signal from the section 402 to the section 404, a portion of the signal may be reflected as indicated by $\Gamma_A$ in the block diagram 400. Similarly, reflection may be experienced downstream from the section 404 as indicated by $\Gamma_L$ in the block diagram 400.

In the block diagram 400, $P_L$ may be indicative of the received signal (e.g., a received power) that may be made available to one or more entities, such as a load.

In the block diagram 400, $Z_O$ may be indicative of an impedance associated with a communication channel or line. In some embodiments, $Z_O$ may be equal to 50 ohms.

In the block diagram 400, $Z_A$ may be indicative of an impedance associated with the section 402. The impedance $Z_A$ may change over time in response to, e.g., user effects, changing environmental conditions, etc.

In the block diagram 400, $S_{11}$, $S_{21}$, and $S_{22}$ may be indicative of so-called "scattering parameters" or "S-parameters" as would be known to those of skill in the art. The S-parameters may be determined for a particular environment or circuit using one or more tool sets or technique. For example, a vector network analyzer may be used to measure the S-parameters.

The block diagram 450 includes at least some of the same indicators and parameters described above with respect to the block diagram 400. For the sake of brevity, a complete re-description of those indicators/parameters is omitted.

In some embodiments, the block diagram 450 may be indicative of communications in an uplink or transmit direction with respect to a system or infrastructure, such as a mobile communication system. Thus, in some embodiments, one or more signals may be transmitted from the load to the section 404, and then from the section 404 to the section 402 in the block diagram 450. In transmitting a signal from the section 404 to the section 402 in the block diagram 450, at least a portion of the signal may be reflected as indicated by $|\Gamma_{in}|^2$.

In some embodiments, tuning or matching may be performed to reduce or minimize the reflections indicated by $|\Gamma_{in}|^2$ as a result of $\Gamma_A$ in the block diagrams 400 and 450. For example, in some embodiments an impedance associated with the section 404 may be controlled or modified to match the impedance $Z_A$ of the section 402. In some embodiments, reflection-less matching or complex conjugate matching may be used. In some embodiments, the section 402 may be associated with an antenna. In some embodiments, the section 404 may be associated with a tuning or matching circuit.

In some embodiments, once the impedance $Z_A$ of the section 402 is determined, the impedance of the section 404 may be adjusted so as to match the impedance $Z_A$.

In some embodiments, one or more computations may be performed to determine the impedance $Z_A$ of the section 402. For example, in connection with the downlink or receive side, two measurements ($P_L^{(1)}$ and $P_L^{(2)}$) may be made. The two measurements $P_L^{(1)}$ and $P_L^{(2)}$ may generally adhere to equation #1 as follows:

$$P_L = \frac{|V_A|^2}{8Z_o}|S_{21}|^2 \frac{(1-|\Gamma_L|^2)|1-\Gamma_A|^2}{|1-S_{22}\Gamma_L|^2|1-\Gamma_A\Gamma_{in}|^2}. \qquad (1)$$

In equation #1 above, $V_A$ may correspond to a voltage at section 402. The voltage $V_A$ may be assumed to be a constant. One or more techniques, such as an averaging technique, may be applied to mitigate against variation that may be experienced in connection with the voltage $V_A$.

Using the two measurements $P_L^{(1)}$ and $P_L^{(2)}$ and equation #1, a (non-linear) equation #2 may be composed as the ratio of $P_L^{(1)}$ and $P_L^{(2)}$ as follows:

$$\frac{P_L^{(2)}}{P_L^{(1)}} = \frac{|S_{21}^{(2)}|^2|1-S_{22}^{(1)}\Gamma_L|^2|1-\Gamma_A S_{11}^{(1)}|^2}{|S_{21}^{(1)}|^2|1-S_{22}^{(2)}\Gamma_L|^2|1-\Gamma_A S_{11}^{(2)}|^2}. \qquad (2)$$

In connection with the uplink or transmitter side, reflected signal may be measured in accordance with equation #3 as follows:

$$|\Gamma_{in}|^2 = \left|S_{22}^{(1)} + \frac{S_{12}^{(1)}S_{21}^{(1)}\Gamma_A}{1-S_{11}^{(1)}\Gamma_A}\right|^2 = \rho_0^2, \qquad (3)$$

where $\rho_O$ may be indicative of a reflection coefficient in a transmit mode.

Equation #2 and equation #3 may be used to solve for $\Gamma_A$ and the impedance $Z_A$ of the section 402 may be determined from equation #4 as follows:

$$\Gamma_A = \frac{Z_A - Z_o}{Z_A + Z_o}, \qquad (4)$$

Figure 5:
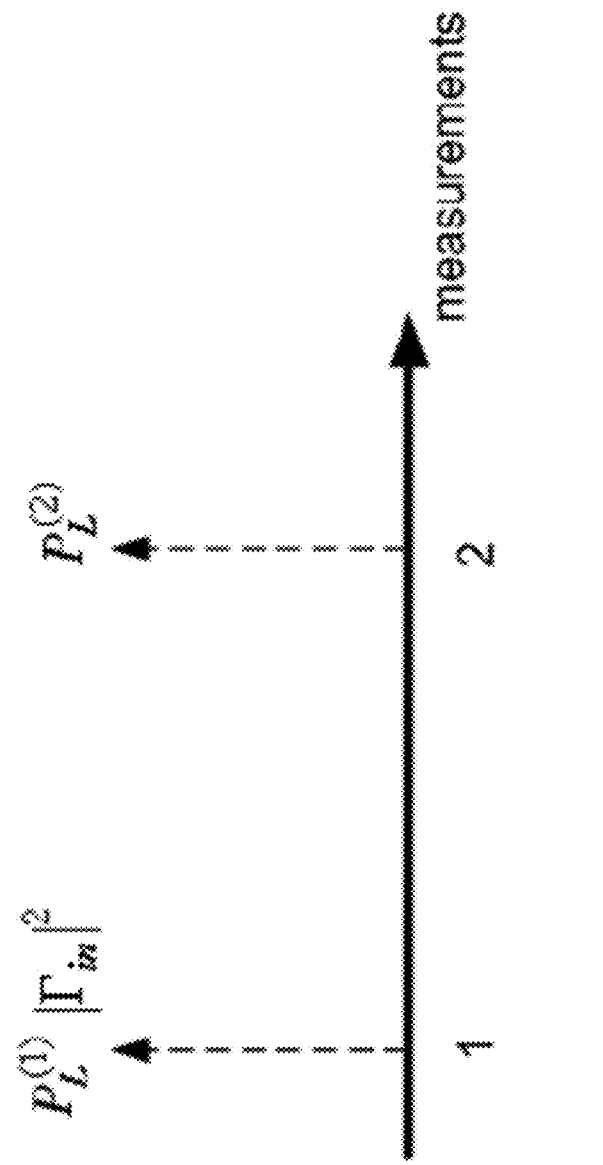
FIG. 5 is an illustration of an exemplary perturbation technique in accordance with one or more embodiments.

FIG. 5 illustrates an example of the timing of the measurements taken in connection with equation #2 and equation #3 given above. As shown in FIG. 5, measurements of $P_L^{(1)}$ and $|\Gamma_{in}|^2$ may be taken at the same time (e.g., during a first measurement period or iteration, such that the measurements $P_L^{(1)}$ and $|\Gamma_{in}|^2$ may substantially overlap). A measurement of $P_L^{(2)}$ may be taken at a time that is different from the first measurement period (e.g., at a later point in time or at an earlier point in time).

Figure 6:
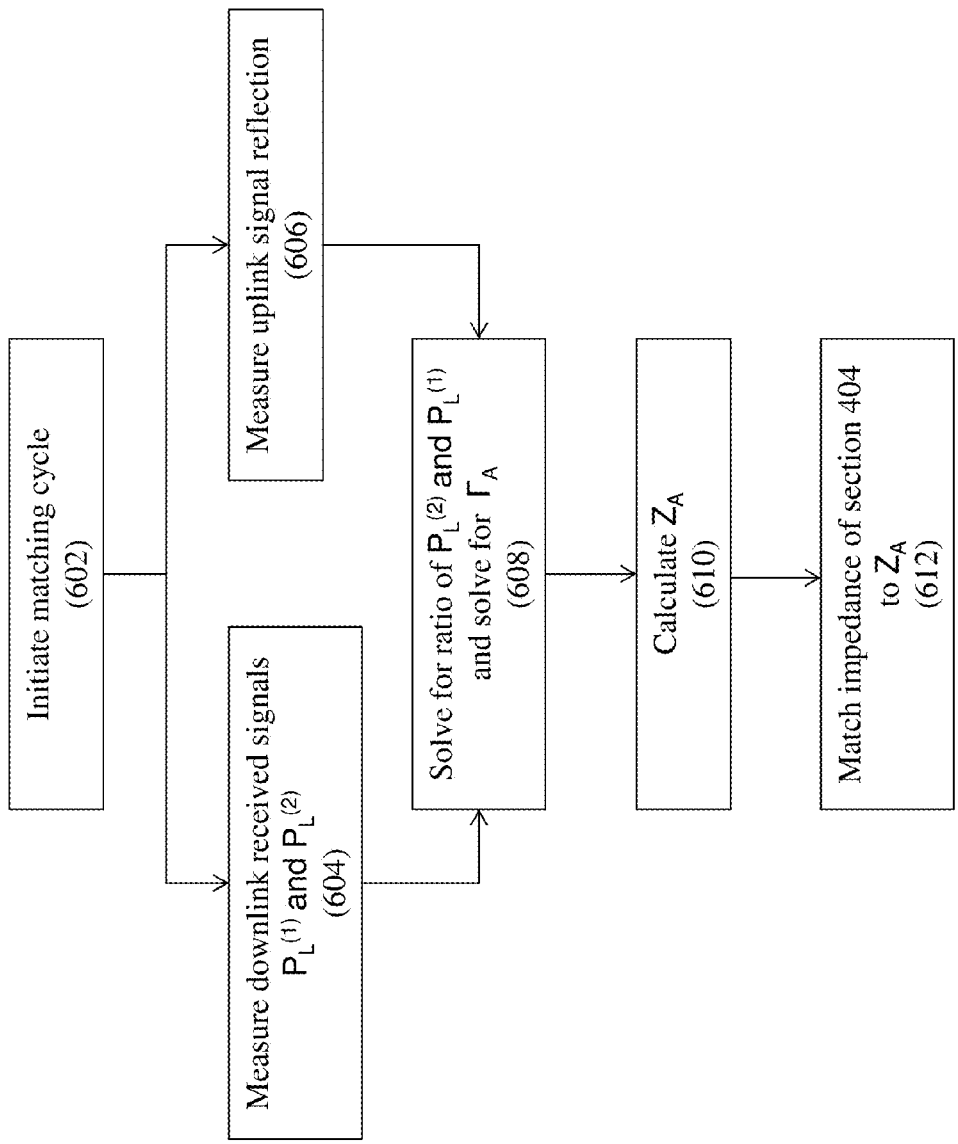
FIG. 6 is a flow diagram of an exemplary method in accordance with one or more embodiments.

FIG. 6 illustrates a flow diagram of a method that may be used to calculate the impedance $Z_A$ of the section 402 in accordance with one or more embodiments. In block 602, a matching cycle operation may be initiated. In some embodiments, the initiation of block 602 may take place in response to a trigger signal. In some embodiments, the initiation of block 602 may take place in response to one or more clock signals (e.g., an edge of a clock signal).

In block 604, one or more downlink or received signals may be measured. For example, power measurements of the form $P_L^{(1)}$ and $P_L^{(2)}$ described above in connection with equation #1 and equation #2 may be taken. In some embodiments, one or more elements of the section 404 may be perturbed when taking one or both of the measurements $P_L^{(1)}$ and $P_L^{(2)}$.

In block 606, a reflection in one or more uplink or transmit signals may be measured. The measurement associated with the uplink or transmit signal(s) may pertain to, or include, one or more reflected power measurements. In some embodiments, the measurement of block 606 may at least partially coincide with the measurement of block 604. For example, the measurement of block 606 may coincide with the measurement of at least one of $P_L^{(1)}$ and $P_L^{(2)}$.

In block 608, a ratio of $P_L^{(2)}$ to $P_L^{(1)}$ (or vice versa) may be solved for and $|\Gamma_{in}|^2$ may be solved for using equation #s 1-3 above and the measurements of the blocks 604 and 606, assuming that the S-parameters are known or are obtained at some other point during the execution of the method.

In block 610, the impedance $Z_A$ of the section 402 may be calculated using equation #4 above and the solutions of the block 608.

In block 612, an impedance of the section 404 may be matched to the impedance $Z_A$ of the section 402 calculated in the block 610. As part of block 612, one or more parameters (e.g., tuning parameters) may be provided or supplied to the section 404 to obtain such matching.

Blocks 604 and 606 are shown as being in parallel with one another in FIG. 6 so as to indicate that in some embodiments at least a portion of the downlink and uplink measurements may be performed independent of one another (e.g., independent in terms of resources or structures used), while potentially still being at least partially performed at the same time.

In some embodiments, the method of FIG. 6 may repeat so as to adapt the impedance of the section 404 in response to changes in the impedance $Z_A$ of the section 402. In this manner, the impedance of the section 404 may be made to track or match the impedance $Z_A$ of the section 402 over time. The frequency of the execution of the method of FIG. 6 may be selected so as to achieve a particular quality of resolution.

In some embodiments, a number of implementations may be provided to facilitate perturbation techniques described herein. For example, downlink measurements may be performed at baseband where two or more measurement may be obtained in a single iteration of a broadband signal. Such baseband measurements may eliminate the need for a complete measurement period.

In some embodiments, two or more measurement iterations may be provided for reflected power. The measurements may be combined (e.g., averaged, filtered, etc.), and the combined measurement may be used to enhance or improve accuracy.

In some embodiments, two or more measurement iterations may be provided for each received power measurement. The measurements may be combined (e.g., averaged, filtered, etc.) for each respective received power measurement, and the combined respective received power measurement for each may be used to enhance or improve accuracy.

In some embodiments, a measurement that is used may coincide with a measurement with a lowest error rate selected from a set of measurements.

Figure 7:
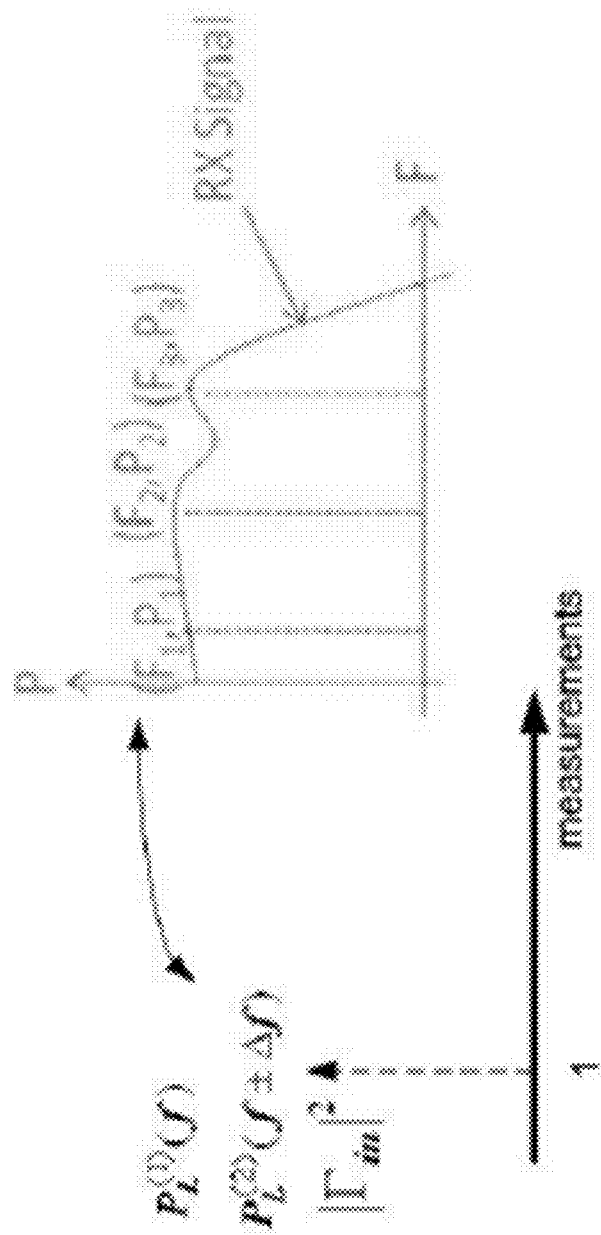
FIG. 7 is an illustration of an exemplary perturbation technique in accordance with one or more embodiments.

In some embodiments, measurements in the downlink and uplink directions may be taken at different frequencies. For example, a frequency in the uplink band and a frequency in the downlink band may be used. Use of different frequencies may eliminate a need to use more than one measurement period. The measurements may be obtained during typical operations, such that iterations based on perturbing the elements of the section 404 may be eliminated. FIG. 7 illustrates such an embodiment, where f may correspond to a first frequency and (f±Δf) may correspond to a second frequency different from the first frequency by an amount equal to Δf. Relative to FIG. 5, in FIG. 7 a single measurement period is shown to obtain $P_L^{(2)}$, $P_L^{(1)}$, and $|\Gamma_{in}|^2$.

In some embodiments, an analytical solution may be used with respect to the proposed system of equations. For example, $x = [C_1, C_2, \ldots L_1, L_2, \ldots]$ may denote a set of tunable components, such as a number of tunable capacitors (C) and inductors (L). For notational convenience, $S = S^{(1)}$ may denote the S-parameter matrix associated with the set of tunable components $x^{(1)}$, and $T = S^{(2)}$ may denote the S-parameter matrix associated with the perturbed values $x^{(2)}$, and $S_{ik}$, $T_{ik}$ for i=1, 2 and k=1, 2 may denote the elements of the matrices S and T.

$S_{ik}$ and $T_{ik}$ may be expressed in the form of equations #5 as follows:

$$\begin{cases} S_{ik} = S_{ik}^R + jS_{ik}^I \\ T_{ik} = T_{ik}^R + jT_{ik}^I, \end{cases} \quad (5)$$

where subscripts R and I may denote real and imaginary parts, respectively.

$\Gamma_A$ and $\Gamma_L$ may be expressed in a similar manner. For example, $\Gamma_A$ and $\Gamma_L$ may be expressed in accordance with equations #6 as follows:

$$\begin{cases} \Gamma_A = \Gamma_A^R + j\Gamma_A^I \\ \Gamma_L = \Gamma_L^R + j\Gamma_L^I. \end{cases} \quad (6)$$

Equations #2 and #3 may be rewritten using equations #5 and #6. The following definitions may be adhered to in accordance with equations #7 and #8 as follows:

$$\begin{cases} f_1(S) = S_{12}^R S_{21}^R S_{22}^R - S_{12}^I S_{21}^I S_{22}^R + S_{12}^I S_{21}^R S_{22}^I + S_{12}^R S_{21}^I S_{22}^I \\ f_2(S) = S_{12}^I S_{21}^R S_{22}^R + S_{12}^R S_{21}^I S_{22}^R - S_{12}^R S_{21}^R S_{22}^I + S_{12}^I S_{21}^I S_{22}^I, \end{cases} \quad (7)$$

$$\begin{cases} f_d(S, \rho_0) = |S_{22}|^2 - \rho_0^2 \\ f_c(S, \rho_0) = 2S_{11}^I f_d(S, \rho_0) - 2f_2(S) \\ f_b(S, \rho_0) = 2S_{11}^R f_d(S, \rho_0) + 2f_1(S) \\ f_a(S, \rho_0) = |S_{11}|^2 f_d(S, \rho_0) + |S_{12}|^2 |S_{21}|^2 - 2S_{11}^R f_1(S) - 2S_{11}^I f_2(S). \end{cases} \quad (8)$$

Σ may be set equal to (S, T, $\Gamma_L$, $P_L^{(1)}$, $P_L^{(2)}$) for measurements in a receive or downlink mode. g may be defined in accordance with equation #9 as follows:

$$g(\sigma, \Gamma_L) = |\Gamma_L|^2 |\sigma|^2 - 2\sigma^R \Gamma_L^R + 2\sigma^I \Gamma_L^I + 1, \quad (9)$$

for $\sigma \in \{S_{22}, T_{22}\}$. g may be expressed in accordance with a set of equations #10 as follows:

$$\begin{cases} g_d(\Sigma) = P_L^{(2)} / P_L^{(1)} |S_{21}|^2 g(T_{22}, \Gamma_L) - |T_{21}|^2 g(S_{22}, \Gamma_L) \\ g_c(\Sigma) = 2P_L^{(2)} / P_L^{(1)} T_{11}^I |S_{21}|^2 g(T_{22}, \Gamma_L) - 2S_{11}^I |T_{21}|^2 g(S_{22}, \Gamma_L) \\ g_b(\Sigma) = -2P_L^{(2)} / P_L^{(1)} T_{11}^R |S_{21}|^2 g(T_{22}, \Gamma_L) + 2S_{11}^R |T_{21}|^2 g(S_{22}, \Gamma_L) \\ g_a(\Sigma) = P_L^{(2)} / P_L^{(1)} |S_{11}|^2 |S_{21}|^2 g(T_{22}, \Gamma_L) - |S_{11}|^2 |T_{21}|^2 g(S_{22}, \Gamma_L). \end{cases} \quad (10)$$

Accordingly, an analysis may be performed to find the solution $\Gamma_A$ to the system of equations #11 as follows:

$$\begin{cases} a_1 |\Gamma_A|^2 + b_1 \Gamma_A^R + c_1 \Gamma_A^I + d_1 = 0 \\ a_2 |\Gamma_A|^2 + b_2 \Gamma_A^R + c_2 \Gamma_A^I + d_2 = 0, \end{cases} \quad (11)$$

where $a_1 = f_a(S, \rho_O)$, $b_1 = f_b(S, \rho_O)$, $c_1 = f_c(S, \rho_O)$, and $d_1 = f_d(S, \rho_O)$, and may be obtained using equation #8, and where $a_2 = g_a(\Sigma)$, $b_2 = g_b(\Sigma)$, $c_2 = g_c(\Sigma)$, and $d_2 = g_d(\Sigma)$, and may be obtained using equation #10.

From the system of equations #11, an equation #12 may be generated as follows:

$$\Gamma_A^I = k_1 \Gamma_A^R + k_2, \quad (12)$$

where $k_1$ and $k_2$ may be as provided in the set of equations #13 as follows:

$$\begin{cases} k_1 = \dfrac{a_2 b_1 - a_1 b_2}{a_1 c_2 - a_2 c_1} \\ k_2 = \dfrac{a_2 d_1 - a_1 d_2}{a_1 c_2 - a_2 c_1}. \end{cases} \quad (13)$$

Equation #14, provided below, follows from the above:

$$l_1 (\Gamma_A^R)^2 + l_2 \Gamma_A^R + l_3 = 0, \quad (14)$$

where $l_1$, $l_2$, and $l_3$ are as provided in the set of equations #15:

$$\begin{cases} l_1 = a_1 (1 + k_1^2) \\ l_2 = a_1 (2 k_1 k_2) + c_1 k_1 + b_1 \\ l_3 = a_1 k_2^2 + c_1 k_2 + d_1. \end{cases} \quad (15)$$

An admissible value of $\Gamma_A$ may be determined by solving equation #14 for the real part (R) of $\Gamma_A$ and then substituting that determined real part (R) of $\Gamma_A$ into equation #12 to find the imaginary part (I) of $\Gamma_A$.

Figure 8:
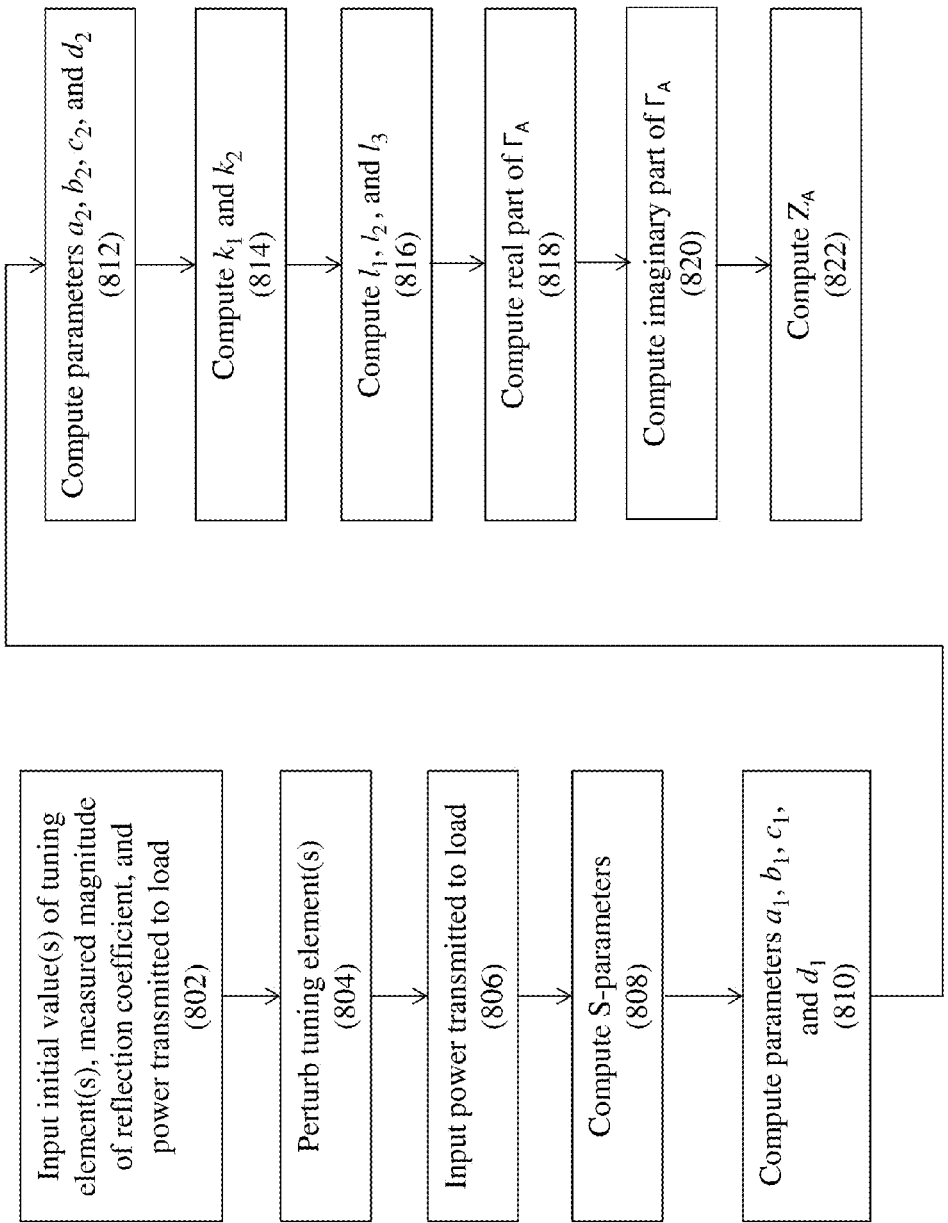
FIG. 8 is a flow diagram of an exemplary method in accordance with one or more embodiments.

FIG. 8 is a flow diagram of a method that may be used to calculate an impedance (e.g., the impedance $Z_A$ of section 402) in accordance with one or more embodiments.

In block 802, initial value(s) for one or more tuning elements $x^{(1)}$, a measured magnitude of a coefficient of reflection ($\rho_O$) in a transmit mode, and power transmitted to the load ($P_L^{(1)}$) in a receive mode may be input or obtained.

In block 804, one or more tuning elements (e.g., the one or more tuning elements $x^{(1)}$) may be perturbed to $x^{(2)}$. For example, the one or more tuning elements may be perturbed in terms of at least one of frequency/frequencies and component value(s).

In block 806, (a second) power transmitted to the load ($P_L^{(2)}$) in the receive mode may be input or obtained.

In block 808, S-parameters S associated with a matching circuit (e.g., section 404) with tuning elements $x^{(1)}$ and T associated with tuning elements $x^{(2)}$ may be computed.

In block 810, the parameters $a_1$, $b_1$, $c_1$, and $d_1$ may be computed. The parameters $a_1$, $b_1$, $c_1$, and $d_1$ may be computed using equations #7 and #8 above, where $a_1=f_a(S, \rho_O)$, $b_1=f_b(S, \rho_O)$, $c_1=f_c(S, \rho_O)$, and $d_1=f_d(S, \rho_O)$.

In block 812, the parameters $a_2$, $b_2$, $c_2$, and $d_2$ may be computed. The parameters $a_2$, $b_2$, $c_2$, and $d_2$ may be computed using equations #9 and #10 above, where $\Sigma=(S, T, \Gamma_L, P_L^{(1)}, P_L^{(2)})$.

In block 814, $k_1$ and $k_2$ may be computed using the set of equations #13 above.

In block 816, $l_1$, $l_2$, and $l_3$ may be computed using the set of equations #15 above.

In block 818, an admissible solution for the real part (R) of $\Gamma_A$ may be computed using equation #14 above.

In block 820, the imaginary part (I) of $\Gamma_A$ may be computed using equation #12 above, based on the computation for the real part (R) of $\Gamma_A$ in block 818.

In block 822, the impedance (e.g., impedance $Z_A$ of section 402) may be computed using equation #4 above, based on the computations of $\Gamma_A$ in blocks 818 and 820.

Figure 9:
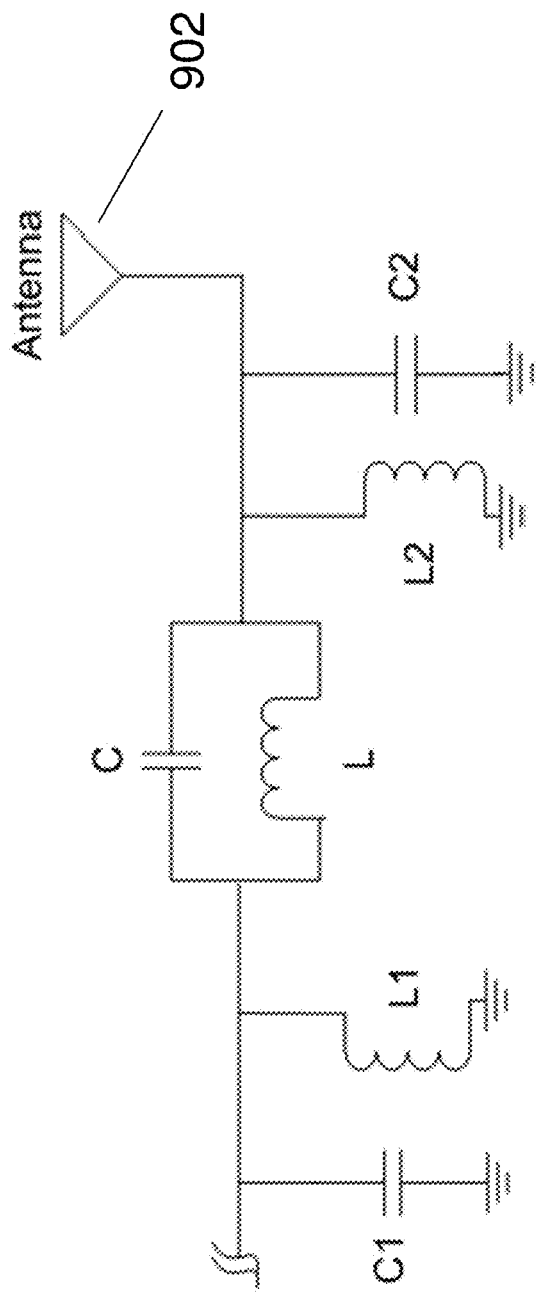
FIG. 9 is a schematic of an exemplary circuit in accordance with one or more embodiments.

FIG. 9 illustrates a circuit in accordance with one or more embodiments. In some embodiments, one or more of the capacitors C, C1, and C2, and/or one or more of the inductors L, L1, and L2 may be tunable. Any number of capacitors or inductors may be used in some embodiments. In some embodiments, a perturbation step size may be used, such as 30%. In some embodiments, perturbations may be made in terms of frequency as an alternative to, or in addition to, perturbations made in terms of component values.

In some embodiments, one or more of the capacitors C, C1, and C2, and/or one or more of the inductors L, L1, and L2 may be included in, or associated with, the section 404 of the block diagrams 400 and 450. Similarly, the antenna 902 may be included in, or associated with, the section 402 of the block diagrams 400 and 450.

FIG. 10 illustrates a block diagram in accordance with one or more embodiments. As shown, a controller 1002 may be coupled to the sections 402 and 404. The controller may include, or may be included in, one or more of the components and devices shown and described above in connection with FIGS. 1-3. For example, in some embodiments the controller 1002 may include at least one processor 1004, and memory 1006 having instructions stored thereon that, when executed by the at least one processor 1004, cause the controller 1002 to perform one or more of the methodological acts described herein.

In some embodiments, the controller 1002 may acquire one or more measurements from, e.g., one or more of the sections 402 and 404. The controller 1002 may process the acquired one or more measurements. For example, the controller 1002 may process the acquired one or more measurements to compute or determine an impedance of, e.g., the section 402. The controller 1002 may provide one or more parameters (e.g., tuning parameters) to the section 404 based on a computed impedance of the section 402. The parameters provided by the controller 1002 to the section 404 may cause the impedance of the section 404 to match the computed impedance of the section 402.

Embodiments of the disclosure may be tied to one or more particular machines. For example, in some embodiments a controller may receive or acquire one or more measurements associated with, e.g., a transceiver or an antenna. The measurements may include power measurements in some embodiments. The controller may be configured to compute an impedance associated with the antenna and provide parameters to a matching circuit to match the impedance of the matching circuit to the impedance of the antenna.

Various examples herein have been described in terms of matching impedances to one another or calculating or computing impedances. It is understood that impedance may be expressed in other terms. For example, one skilled in the art would appreciate that "admittance" is merely the reciprocal of the impedance. Furthermore, in general impedance may refer to a combination of a resistive element or resistance and a reactive element or reactance, however, it is understood that one or even both of the resistive element and the reactive element could have values of zero in some instances. Use of the term impedance herein is intended to encompass not only the traditional use of that term, but also such other alternative terms or forms of expression in various instances.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments of the disclosure may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments of the disclosure may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein. In some embodiments, the functionality described herein may be implemented in hardware, software, firmware, or any combination thereof.

The particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A device comprising:
   a transceiver comprising a first section and a second section, the first section comprising an antenna; and
   a controller configured to:
      receive an uplink reflected power measurement and a downlink power measurement at the same time,
      calculate an impedance associated with the first section based on the uplink power measurement and the downlink power measurement, the calculated impedance associated with the first section is the complex impedance of the antenna in substantially real-time, and
      provide a tuning parameter to the second section to match an impedance of the second section with the impedance of the first section.

2. The device of claim 1, wherein the second section comprises a matching circuit comprising at least one of a tunable capacitor and a tunable inductor.

3. The device of claim 1, wherein the second section comprises at least one tunable capacitor that is formed from one or more switchable capacitors.

4. The device of claim 1, wherein the second section comprises at least one tunable inductor that is formed from one or more switchable inductors.

5. The device of claim 1, wherein the controller is configured to:
   receive a second downlink power measurement,
   wherein the calculation of the impedance associated with the first section is further based on the second downlink power measurement.

6. The device of claim 5, wherein the controller is configured to receive the second downlink power measurement at the same time as the downlink power measurement, and wherein the downlink power measurement is associated with a first frequency and the second downlink power measurement is associated with a second frequency.

7. The device of claim 5, wherein the controller is configured to receive the second downlink power measurement at a time that is different from when the controller is configured to receive the downlink power measurement.

8. The device of claim 5, wherein the downlink power measurement and the second downlink power measurement are performed at baseband, and wherein the downlink power measurement and the second downlink power measurement are obtained in a single measurement iteration of a broadband signal.

9. The device of claim 1, wherein the controller is configured to calculate the complex impedance associated with the first section as a function of at least one of:
   an average of a plurality of uplink power measurements taken over at least two measurement iterations, wherein the uplink power measurements comprise the uplink power measurement, and
   an average of a plurality of downlink power measurements taken over at least two measurement iterations, wherein the downlink power measurements comprise the downlink power measurement.

10. The device of claim 1, wherein the controller is configured to:
    determine that the uplink power measurement has a lowest error rate amongst a plurality of uplink power measurements received at the controller,
    determine that the downlink power measurement has a lowest error rate amongst a plurality of downlink power measurements received at the controller, and
    select, based on said determinations, the uplink power measurement and the downlink power measurement when calculating the impedance associated with the first section.

11. The device of claim 1, wherein the device is a mobile device.

12. A device comprising:
    at least one processor; and
    memory having instructions stored thereon that, when executed by the at least one processor, cause the device to:
       receive an uplink reflected power measurement and a downlink power measurement associated with a transceiver at the same time,
       calculate an impedance associated with a first section of the transceiver based on the uplink power measurement and the downlink power measurement, the first section of the transceiver comprising an antenna, and the calculated impedance associated with the first section of the transceiver is the impedance of the antenna, and
       provide a tuning parameter to a second section of the transceiver to match an impedance of the second section with the impedance of the first section, the second section of the transceiver comprising a matching circuit including at least one tunable component,
       wherein the tuning parameter is configured to tune at least one tunable component, and is configured to provide a perturbation of the second section of the transceiver in terms of frequency.

13. The device of claim 12, wherein the instructions, when executed by the at least one processor, cause the device to:
    receive a second downlink power measurement associated with the transceiver,
    wherein the calculation of the impedance associated with the first section of the transceiver is further based on the second downlink power measurement.

14. The device of claim 12, wherein the instructions, when executed by the at least one processor, cause the device to:
    receive the uplink reflected power measurement and the downlink power measurement associated with the transceiver during a common measurement period.

15. A device comprising:
    at least one processor; and
    memory having instructions stored thereon that, when executed by the at least one processor, cause the device to:
       input initial values for one or more tunable elements,
       input a measured magnitude of a reflection coefficient in a transmit mode,
       input a power transmitted to a load in a receive mode,
       perturb the one or more tunable elements to obtain second values for the one or more tunable elements,
       input a second power transmitted to the load in the receive mode, and
       compute a reflection coefficient for an antenna based on the initial values for the one or more tunable elements, the measured magnitude of the reflection coefficient, the power transmitted to the load in the receive mode, the second values for the one or more tunable elements, and the second power transmitted to the load in the receive mode.

16. The device of claim 15, wherein the instructions, when executed by the at least one processor, cause the device to:

perturb the one or more tunable elements in terms of at least one of a frequency and a component value to obtain the second values for the one or more tunable elements.

17. The device of claim 15, wherein the instructions, when executed by the at least one processor, cause the device to:
   compute an impedance of the antenna based on the computed reflection coefficient, and
   provide at least one tuning parameter to a matching circuit based on the computed impedance.

18. A method comprising:
   receiving, by a computing device, an uplink reflected power measurement and a downlink power measurement at the same time;
   receiving, by the computing device, a second downlink power measurement,
   calculating, by the computing device, an impedance associated with a first section of a transceiver based on the uplink power measurement and the downlink power measurement, the calculation of the impedance associated with the first section based further on the second downlink power measurement; and
   providing, by the computing device, a tuning parameter to a second section of the transceiver to match an impedance of the second section with the impedance of the first section.

19. The method of claim 18, further comprising:
   receiving, by the computing device, the second downlink power measurement at the same time as the downlink power measurement,
   wherein the downlink power measurement is associated with a first frequency and the second downlink power measurement is associated with a second frequency.

20. The method of claim 18, further comprising:
   receiving, by the computing device, the second downlink power measurement at a time that is different from when the computing device receives the downlink power measurement.

* * * * *